United States Patent [19]

Buss et al.

[11] Patent Number: 5,204,783

[45] Date of Patent: Apr. 20, 1993

[54] FOCUSING APPARATUS FOR A FOLDED COLLIMATING LENS IN AN X-RAY IMAGING SYSTEM

[75] Inventors: Terry D. Buss, Watertown; Johnathan C. Boomgaarden, Waukesha; Michael D. Maki, Oconomowoc, all of Wis.; Sharad K. Bohra, St. Nom La Breteche, France

[73] Assignee: General Electric Company, Milwaukee, Wis.

[21] Appl. No.: 759,584

[22] Filed: Sep. 13, 1991

[51] Int. Cl.[5] .............................................. G02B 7/02
[52] U.S. Cl. .................................................. 359/811
[58] Field of Search ......................... 359/694, 821, 811

[56] References Cited

U.S. PATENT DOCUMENTS 4,469,403 9/1984 Haas et al. ........................... 359/821

Primary Examiner—Scott J. Sugarman
Attorney, Agent, or Firm—Quarles & Brady

[57] ABSTRACT

A focusing apparatus is provided for facilitating the adjustment of the focus for a fixed optics, folded collimating lens in an X-ray imaging system. An idler member is gear driven by an adjustment knob, and is threaded to receive a mating threaded portion of the collimating lens. The collimating lens is constrained from rotating by set screws on horizontal arms which bear on a stationary bushing. Rotation of the adjustment knob thereby causes rotation of the idler member while the collimating lens is restrained from rotating. This results in straight vertical movement of the collimating lens, up or down, until optimum focus is achieved. The set screws also provide for fine rotational alignment of the collimating lens with an image head.

7 Claims, 3 Drawing Sheets

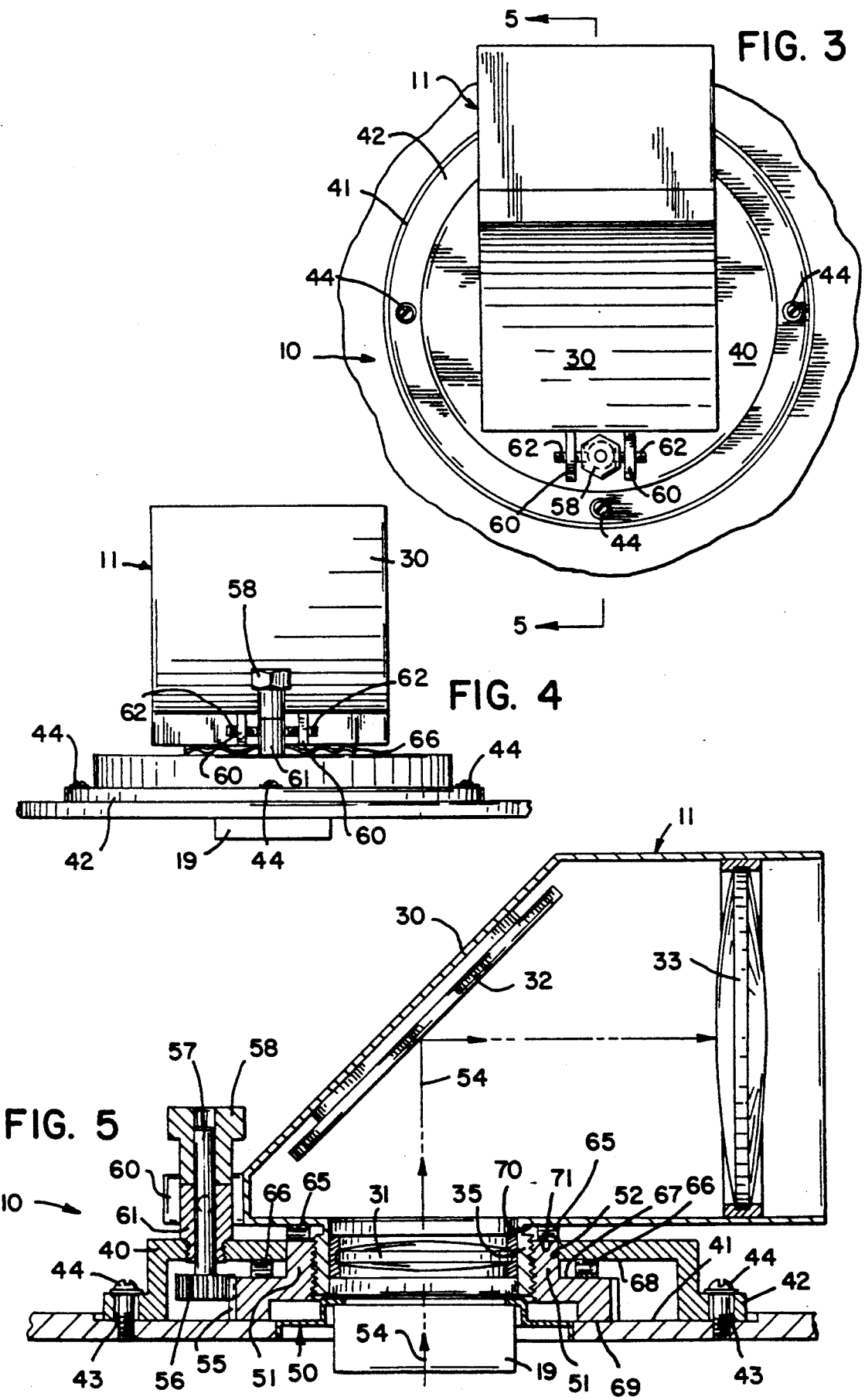

FOCUSING APPARATUS FOR A FOLDED COLLIMATING LENS IN AN X-RAY IMAGING SYSTEM

BACKGROUND OF THE INVENTION

The field of the invention is collimating lenses for X-ray imaging systems and, more particularly, such collimating lenses which utilize a "folded" optical path.

In X-ray imaging systems, an image intensifier tube receives X-rays that have passed through a subject. The image intensifier tube converts the X-rays into an optical image by means of a surface coated with suitable phosphors. The image intensifier tube is usually positioned vertically, for example over a human patient laying prone. The optical output of the image intensifier tube is then obtained through an optical output aperture in the top of a case enclosing the image intensifier tube. The image intensifier tube itself is a hermetically sealed vacuum tube, with an output phosphor surface positioned just below the optical output aperture. A collimating lens is disposed directly over the optical output aperture, and includes an array of lenses to focus the optical output of the image intensifier tube into an image head for subsequent processing of the optical output.

Because of the critical importance of high quality optics, in-line, or axial collimating lenses have been overwhelmingly preferred in prior art X-ray imaging systems (for example, see U.S. Pat. No. 4,980,905). The axial collimating lenses in popular use utilize multiple individual lenses, precision aligned with respect to each other in a straight cylindrical lens housing. X-ray imaging requires extremely high quality, low distortion optics so as to preserve as much detail as possible in the image being processed. In order to achieve that image quality, it is necessary to utilize fixed optical elements in the collimating lens. That is, the individual lenses which are used in the collimating lens must be fixed with respect to each other. As a result, the entire collimating lens is moved with respect to the image intensifier optical output aperture to achieve optimum focus. In that case, focus is achieved by moving the entire lens assembly axially with respect to the optical output aperture. Since the direction of the optical path in an axial collimating lens is invariant with respect to axial rotation, lateral axial movement of the lens assembly is readily achieved by conventional screw threads and simple rotation of the collimating lens assembly. Thus, the conventional axial collimating lenses with in-line, screw thread focusing, have been satisfactory for most prior X-ray imaging systems.

One problem that has arisen in the art is that image intensifier tubes are now being utilized which are physically larger, e.g. taller, than their contemporaries. As a result, use of axial collimating lenses necessitates placement of the image head at a correspondingly greater height. The increased height of the image head in turn greatly complicates access to the image head. Since access to the image head is routinely required, for example, to retrieve exposed film, the greater height of the image head is a significant detriment. Also, a correspondingly greater ceiling height is required for the room which is to contain the X-ray apparatus, which may limit the locations in which the X-ray apparatus may be employed.

To overcome the height problems associated with the larger image intensifier tubes, the use of a folded optic collimating lens has been attempted in prior systems. Folded lens optics are generally known, which utilize an angled mirror to redirect the optical path. For example, a mirror at 45° results in a 90° change in the direction of the optical path. The folded optics collimating lens re-directs the optical output of the image intensifier tube at a 90° angle so that the image head may be placed aside, rather than above, the image intensifier tube. In that way, the image head is lower and easier to access, and the overall height of the X-ray apparatus is reduced.

The folded collimating lens assembly includes separate input and output lenses on opposite sides of the mirror. In that case, focusing by means of a conventional screw threaded lens assembly can be applied to only one of the input or output lenses, and will necessarily change the relative, internal spacing between the input and output lenses. While it is still possible to achieve focus in that manner, the resulting image quality is substantially degraded over that which is achieved by lens assemblies with fixed dimensions between the internal lens elements. Consequently, conventional screw thread focusing of a folded optics collimating lens is not practicable.

Focusing of prior folded optics collimating lenses has therefore required adjusting the axial lateral spacing between the collimating lens input and the image intensifier output aperture. This process is further complicated in that it is not practical to permit rotation folded optics collimating lens assembly; the output of the folded optics collimating lens must remain directed towards the image head. As a result, focusing of prior folded optics collimating lenses has involved essentially trial and error, manual adjustment by the use of shims, etc., to achieve the desired focus. Clearly, this is a time consuming, painstaking process. In addition, optimum focus is often not achieved, or is at least difficult to verify, due to the inherent inaccuracies of the prior focusing methods.

SUMMARY OF THE INVENTION

A focusing apparatus according to the invention overcomes the limitations in the prior art by greatly facilitating the focus adjustment for a fixed optics, folded collimating lens in X-ray imaging apparatus. The focusing apparatus includes a folded optics collimating lens having a threaded cylindrical member projecting down from a bottom surface of the collimating lens. An idler member is formed with threads in a central bore, with the threads on the idler member being in mating engagement with the threads on the cylindrical member of the collimating lens. A base is provided with a guide opening which receives a mating cylindrical surface on the idler member. The idler member is thereby rotatably disposed in the guide opening of the base. A means is then provided for rotating the idler member within the guide opening of the base, while another means is provided for simultaneously restraining rotation of the collimating lens. Consequently, rotation of the idler member imparts linear movement to the collimating lens along an axis of the rotation, thereby adjusting the focus of the collimating lens with respect to an image source opposite the cylindrical member of the collimating lens.

An important object of the invention is to permit the use of fixed optics, folded collimating lenses for X-ray imaging systems. Folded lenses with variable geometry optics are very easy to focus, but sacrifice substantial image quality as a result. By facilitating the focusing adjustment of fixed optics, folded collimating lenses, the higher image quality thereof may be realized without the difficulty of focus adjustment which prevailed in the prior art.

Another object of the present invention is to provide a high degree of precision in the focus adjustment. A reference surface may formed on the X-ray apparatus, for example, on a top surface of an image intensifier case. The focusing apparatus may then be mounted above the reference surface and include a means for urging the idler member against the reference surface. The idler member is thereby maintained in precise alignment with the reference surface, reducing error in the focus adjustment due to imprecise or varying positioning of the idler member.

Yet another object of the invention is to provide either manual or motor driven adjustment for the focusing apparatus. The means for rotating the idler member may comprise gear teeth formed on an outer circular circumference of the idler member engaged by a pinion gear fixed to a rotatable shaft. The rotatable shaft may in turn be driven be either a manually rotatable knob or an electric motor drive.

Still another object of the invention is to provide a capability to adjust the rotational direction of the collimating lens output. The means for restraining rotation of the collimating lens may comprise a pair of arms extending from a housing for the collimating lens, with each arm contacting a stop member disposed between the arms. The contact between the arms and the stop member may be provided by an adjustable set screw on each arm, wherein the the position of the arms with respect to the stop member, and the corresponding angular orientation of the collimating lens, is adjustable.

BRIEF DESCRIPTION OF THE DRAWINGS

FIG. 3 is a top view of the focusing apparatus and collimating lens of FIG. 1;

FIG. 4 is a rear view of the focusing apparatus and collimating lens of FIG. 1;

FIG. 5 is a sectional view taken on line 5—5 of FIG. 3; and

DETAILED DESCRIPTION OF THE INVENTION

Figure 1:
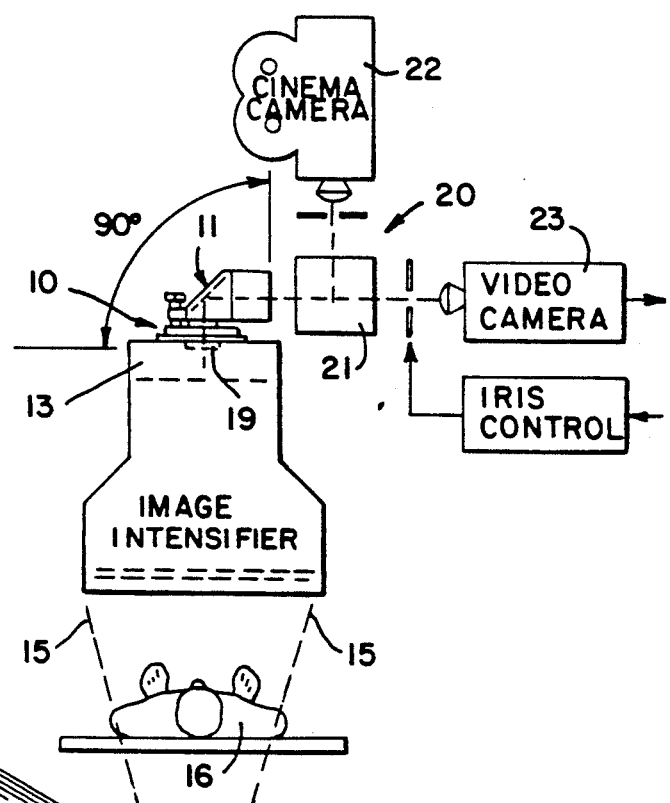
FIG. 1 is a block diagram of an X-ray imaging system which incorporates the focusing apparatus of the present invention.
Figure 2:
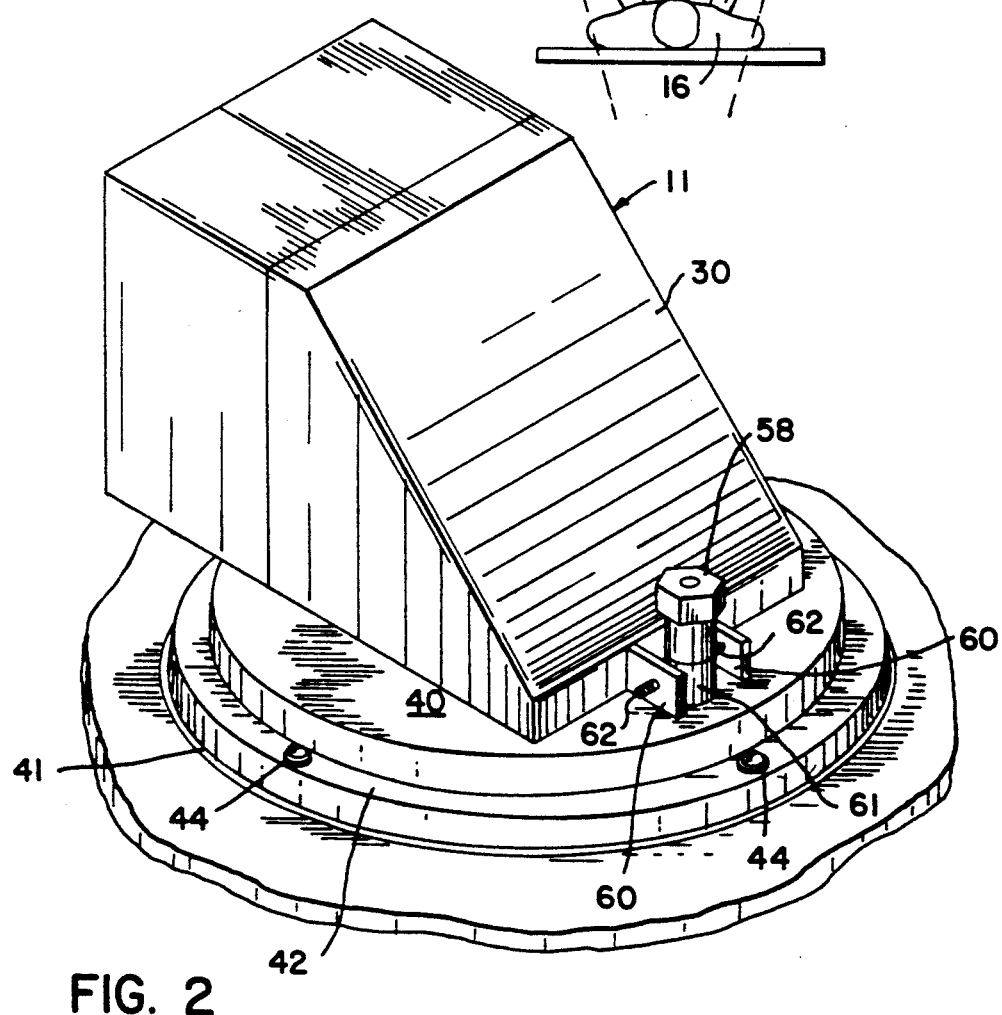
FIG. 2 is a perspective view of the focusing apparatus and collimating lens of FIG. 1.

Referring to FIG. 1, a focusing apparatus 10 for a folded optics collimating lens 11 is shown mounted on top of an image intensifier case 13. An image intensifier tube (not shown) inside the case 13 receives an X-ray beam represented by dashed lines 15 after the beam 15 has passed through a patient 16 or other subject to be examined. The image intensifier tube converts the X-ray beam 15 into a corresponding optical output on a suitable phosphor coated surface (not shown) in well known fashion. An optical output aperture 19 is formed in the top of the case 13 and permits the image intensifier optical output to pass through to the collimating lens 11. The collimating lens 11, in turn, directs the optical image into an image head 20, the later comprising components known and used in the art for processing the optical image. Briefly, the image head 20 comprises a beam splitter 21 for directing separate optical outputs to both a cinema, or "cine" camera 22 for filming the image and a video camera 23 for electronic processing of the image.

By utilizing folded optics in the collimating lens 11, the image head 20 may be positioned 90° to the side of the image intensifier 13 as shown in FIG. 1, instead of directly above it as would be required with a conventional axial collimating lens. This invention is directed to an apparatus to permit rapid and precise adjustment of focus for the folded optics collimating lens 11. As discussed above in the background of the invention, fixed geometry optics are necessary to achieve the image quality required for X-ray imaging. As a result of the fixed geometry optics, it is necessary to move the entire collimating lens 11 axially with respect to the image intensifier aperture 19, while at the same time maintaining a constant angular direction for the collimating lens output (i.e. towards the image head 20). This invention provides this capability in a precise and easily adjustable manner.

Referring to FIGS. 2-5, the folded optics collimating lens 11 itself includes a housing 30, an input lens 31, a mirror 32 and an output lens assembly 33. It should be understood that multiple individual lenses may be utilized in the output lens assembly 33, and any number of such individual lenses is represented schematically by lens assembly 33. The input lens 31 is mounted inside a cylindrical member 35 extending down from the housing 30, and is disposed directly over the optical output aperture 19.

Referring primarily to FIG. 5, the focusing apparatus 10 according to the invention includes a base member 40 which is fastened onto a precision ground flat registration surface 41 on the top of the image intensifier case 13. The base 40 has a circular outer rim 42 which is formed with four evenly spaced holes 43. Bolts 44 pass through the holes 43 for fastening the base 40 onto the registration surface 41. Bolts 44 are shown as the preferred fasteners, although it should be apparent that any suitable fastening means is satisfactory, and any number of bolts 44 may be used.

The registration surface 41 is ground with a diameter slightly larger than the outer rim 42 of the base 40, and the holes 44 are slightly oversized with respect to the shanks of the bolts 43. This allows for a slight compliance of the base 40 during the initial fastening of the base 40 onto the registration surface 41. In that way, the lateral positioning of the base 40 (i.e. front to back and side to side) can be adjusted such that the input lens 31 is in line over the optical output aperture 19. Once the base 40 is in the desired lateral position, the bolts 44 are fully tightened. No further adjustment of lateral positioning for the base 40 is necessary for operation of the focusing apparatus 10, unless of course the base is removed or otherwise disturbed from the aligned position.

Once the base 40 is correctly positioned as described above, focusing is accomplished by the mechanism 10 described below, which functions to adjust the axial position (i.e. up and down) of the entire collimating lens 11, while at the same time maintaining a constant direction for the collimating lens output (i.e. towards the image head 20). An idler member 50 includes an upper neck portion 51 which is journaled in a mating top central guide opening 52 formed through the top of the base 40. The idler member 50 is thereby rotatable about an axis 54 running through the center of the guide opening 52. The cylindrical member 35 extending from the bottom of the collimating lens 11 is threaded on its outer surface and engages mating female threads formed in the neck portion 51 of the idler member 50. The axis 54 is therefore also coaxial with the cylindrical member 35 and neck 51, and is also the approximate centerline of the optical path into the input lens 31 of the collimating lens 11.

Again referring primarily to FIG. 5, a spur gear 55 is formed on a lower outside surface of the idler member 50, with teeth in mating engagement with a small pinion gear 56. The pinion gear 56, in turn, is mounted on a shaft 57 which is manually rotatable by means of a knob 58. Therefore, rotation of the knob 58 also causes rotation of the pinion gear 56 and idler member 50. As the idler member 50 rotates, the housing 30 is constrained from rotating by a pair of arms 60 which extend out from the housing 30 on either side of a stop member, or bushing 61, which also journals the shaft 56. One set screw 62 on each arm 60 contacts the bushing 61 from either side thereof to prevent rotation of the housing 30. Since the housing 30 is constrained from rotation, rotation of the idler member 50 as described above results in mutual rotation between the engaging threaded portions of the idler member 50 and the cylindrical member 35 of the housing 30. The result of that mutual rotation is straight linear axial movement of the entire collimating lens assembly 11, e.g. straight up or down with respect to the output aperture 19. It is therefore possible to precisely position the collimating lens 11 to the exact axial position resulting in optimum focus. In the preferred embodiment, the engaging threaded portions of the idler member 50 and the cylindrical member 35 of the housing 30 are nominally 56 mm in diameter and have a pitch of 1 mm (i.e. 1 mm per turn).

Still referring to FIG. 5, two circular wave springs 65 and 66 are employed to maintain precise registration of the focusing components. One wave spring 66 is positioned between a ridge 67 on the idler member 50 and a bottom surface 68 of the base 40. Wave spring 66 thereby urges a bottom surface 69 of the idler member 50 against the registration surface 41. This holds the idler member 50 at a precise, fixed vertical position with respect to the registration surface 41. The second wave spring 65 is positioned between a bottom surface 70 of the housing 30 and a top surface 71 of the neck 51 on the idler member 50. Wave spring 65 thus acts to take up any backlash from the threads between the idler member 50 and the collimating lens 11, thereby providing for smooth, precise adjustment of the focus.

In practice, the procedure for adjusting the focus is as follows. First, the set screws 62 are loosened until they are just touching the bushing 61. The housing 30 is thereby free to slide up and down during the adjustment procedure without the set screws 62 binding on the bushing 61, but still restraining any substantial rotation of the collimating lens 11. The focus is then adjusted by turning the knob 58 to raise or lower the collimating lens 11, while observing the optical output from the image head 20 in real time (i.e. trial and error procedures are not necessary). Once the desired focus is attained, the set screws 62 may be retightened to hold the focused position.

Referring now to FIGS. 2-5, an added benefit of the focusing apparatus 10 according to the invention is that the set screws 62 also provide for a fine, precision adjustment of the rotational alignment of the collimating lens 11 with respect to the image head 20. One of the set screws 62 may be backed off by a slight amount, while the other set screw 62 is advanced. Thus, the collimating lens 11 may be rotated by a small amount to ensure that it is pointed directly at the image head 20. This rotation of the collimating lens 11 will result in a very slight vertical movement due to rotation with respect to the threads on the idler member 50. However, any resulting vertical movement is extremely small due to the fine pitch of the threads and the small rotational angle involved (usually only a few arc-minutes). It has been found in practice that any such resulting vertical movement is so small that the focus is not detectably affected. However, if necessary, the focus may be readjusted once the rotational angle is corrected.

Figure 6:
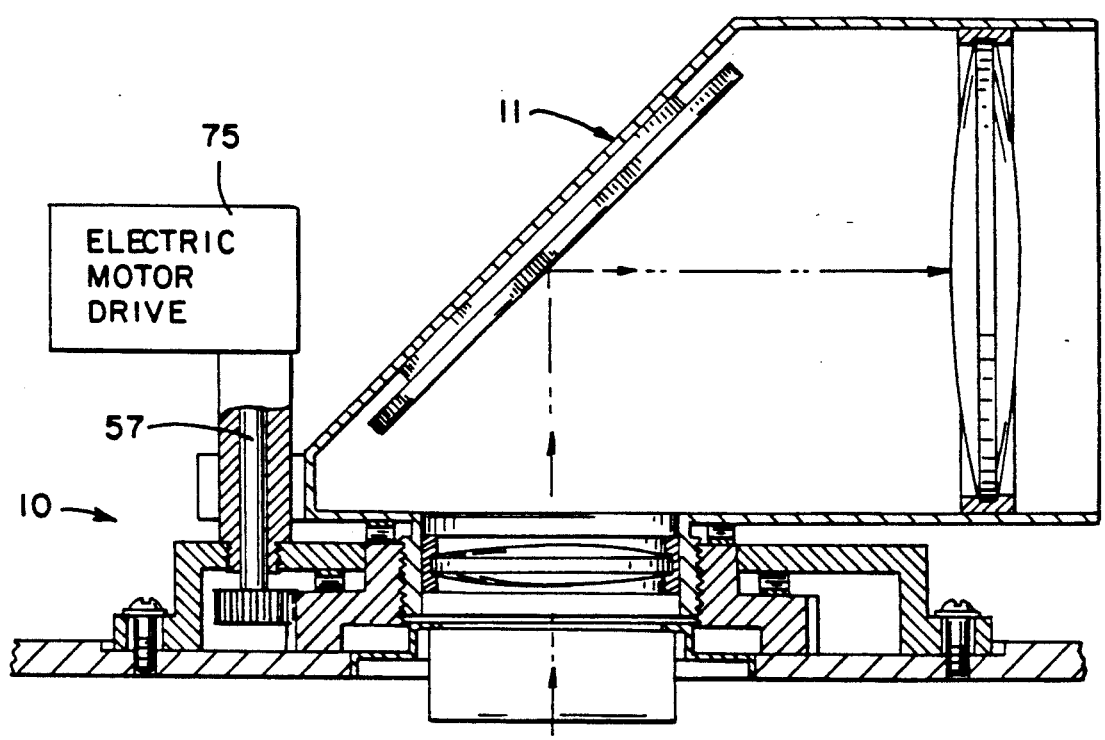
FIG. 6 is a view similar to FIG. 5 except showing an electric motor drive for the focusing apparatus.

It should be apparent to those skilled in the art that numerous modifications to the above described preferred embodiment are contemplated within the scope of this invention. As one example, a belt drive may be utilized in lieu of the direct gear drive between the pinion gear 56 and idler member 50. For another example, the pinion drive shaft 57 may be coupled to a conventional bi-directional, gear reduction electric motor drive 75, as shown in FIG. 6. In that case, the focus adjustment may be made from a remote location by means of conventional motor control circuitry (not shown).

We claim:

1. A focusing apparatus for a folded optics collimating lens in an X-ray imaging apparatus comprising:
    a folded optics collimating lens having a threaded cylindrical member projecting down from a bottom surface of the collimating lens;
    an idler member having threads formed in a central bore, with the threads on the idler member being mated to and in mating engagement with the threaded cylindrical member of the collimating lens;
    a base having a guide opening, with the idler member including a cylindrical surface rotatably disposed in the guide opening of the base;
    means for rotating the idler member within the guide opening of the base; and
    means for restraining rotation of the collimating lens;
    wherein rotation of the idler member imparts linear movement to the collimating lens along an axis of the rotation.

2. The focusing apparatus as recited in claim 1 in which the X-ray imaging apparatus includes a reference surface, and the focusing apparatus is mounted above the reference surface and further includes means for urging the idler member against the reference surface.

3. The focusing apparatus as recited in claim 2 in which the means for rotating the idler member comprises gear teeth formed on an outer circumference of the idler member engaged by a pinion gear fixed to a rotatable shaft.

4. The focusing apparatus as recited in claim 3 in which the a knob is attached to the rotatable shaft for manual adjustment of the focusing apparatus.

5. The focusing apparatus as recited in claim 3 in which the rotatable shaft is connected to an electric motor drive for power driven adjustment of the focusing apparatus.

6. The focusing apparatus as recited in claim 1 in which the means for restraining rotation of the collimating lens comprises a pair of arms extending from a housing for the collimating lens, with each arm contacting a stop member disposed between the arms.

7. The focusing apparatus as recited in claim 6 in which the contact between the arms and the stop member is provided by an adjustable set screw on each arm, wherein the the position of the arms with respect to the stop member, and a corresponding angular orientation of the collimating lens, is adjustable.

* * * * *